United States Patent
Younsi et al.

(10) Patent No.: US 6,768,240 B2
(45) Date of Patent: Jul. 27, 2004

(54) METHOD OF MAKING A DYNAMOELECTRIC MACHINE CONDUCTOR BAR AND METHOD OF MAKING A CONDUCTOR BAR DYNAMOELECTRIC MACHINE, THE BAR AND THE MACHINE

(75) Inventors: Karim Younsi, Saratoga County, NY (US); David A. Snopek, Peterborough County (CA); Luc Lafortune, Laval (CA); Jeff D. Sheaffer, Glenville, NY (US); William R. Mischler, Niskayuna, NY (US); Mark Markovitz, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/448,522

(22) Filed: May 30, 2003

(65) Prior Publication Data

US 2003/0197309 A1 Oct. 23, 2003

Related U.S. Application Data

(62) Division of application No. 10/059,179, filed on Jan. 31, 2002.

(51) Int. Cl.$^7$ .............................. H02K 3/32; H02K 3/40
(52) U.S. Cl. ........................... 310/201; 31/196; 31/198
(58) Field of Search .................... 310/195–196, 310/198, 201, 213

(56) References Cited

U.S. PATENT DOCUMENTS

| | | | |
|---|---|---|---|
| 1,891,716 A | * 12/1932 | Laffoon | 310/196 |
| 3,011,082 A | * 11/1961 | Ahrens | 310/64 |
| 3,647,932 A | 3/1972 | Heller et al. | 174/34 |
| 4,133,101 A | 1/1979 | Glover | 29/845 |
| 4,260,924 A | 4/1981 | Lugosi et al. | 29/596 |
| 4,337,567 A | 7/1982 | Lugosi et al. | 29/596 |
| 4,405,553 A | 9/1983 | Lovgren et al. | 264/272.19 |
| 4,714,576 A | 12/1987 | Cotton et al. | 264/46.5 |
| 4,845,837 A | 7/1989 | Lloyd | 29/598 |
| 4,950,438 A | 8/1990 | Nakamura et al. | 264/272.2 |
| 5,066,881 A | 11/1991 | Elton et al. | 310/213 |
| 5,175,396 A | * 12/1992 | Emery et al. | 174/36 |
| 5,281,877 A | 1/1994 | Kazmierczak et al. | 310/59 |

(List continued on next page.)

FOREIGN PATENT DOCUMENTS

| | | | | |
|---|---|---|---|---|
| JP | 1-152938 | * | 6/1989 | H02K/3/40 |
| JP | 2-197231 | * | 8/1990 | H02K/3/32 |
| JP | 3-245748 | * | 11/1991 | H02K/3/40 |

*Primary Examiner*—Burton Mullins
(74) *Attorney, Agent, or Firm*—Ernest G. Cusick; Philip D. Freedman (57) ABSTRACT

A method for making a dynamoelectric machine conductor bar, comprimises providing a plurality of bundled together spiraling strand conductors having surrounding insulation to define a substantially rectangular shape with the strand conductors and strand insulation defining an opposing conductor bar end portion having an electrically insulated gap between the strand insulation adjacent the bar end portion; and applying a filler material to fill the gap to electrically shield the conductor bar end portion and to a greater than 0.080 to about 1.5 inch continuous outer radius surface end portion. A dynamoelectric machine conductor bar comprises a plurality of bundled together spiraling strand conductors having surrounding insulation to define a substantially rectangular shape, with the strand conductors and strand insulation defining an opposing conductor bar end portion; an electrically non-insulated gap between the strand insulation adjacent the conductors at the bar end portion, and an applied filler material filling the gap to electrically shield the conductor bar end portion an applied filler material filling the gap to electrically shield the conductor bar end portion, wherein the filler material defines a greater than 0.080 to about 1.5 inch continuous outer radius surface end portion.

30 Claims, 4 Drawing Sheets

U.S. PATENT DOCUMENTS

| | | | |
|---|---|---|---|
| 5,464,949 A | 11/1995 | Markovitz et al. | 174/120 R |
| 5,527,502 A | 6/1996 | Kiuchi et al. | 264/250 |
| 5,618,891 A | 4/1997 | Markovitz | 525/481 |
| 5,760,516 A | 6/1998 | Baumann et al. | 310/201 |
| 5,771,563 A | 6/1998 | Meier et al. | 29/596 |
| 5,806,169 A | 9/1998 | Trago et al. | 29/596 |
| 6,043,582 A | 3/2000 | Markovitz et al. | 310/213 |
| 6,140,733 A * | 10/2000 | Wedde et al. | 310/196 |
| 6,201,333 B1 | 3/2001 | Furst | 310/201 |
| 6,223,416 B1 | 5/2001 | Boyd, Jr. et al. | 29/596 |
| 6,334,972 B1 | 1/2002 | Cheol-Jin | 264/263 |
| 6,404,092 B1 * | 6/2002 | Baumann et al. | 310/201 |
| 6,531,082 B1 | 3/2003 | Klee | 264/257 |
| 2001/0035692 A1 | 11/2001 | Ong et al. | 310/254 |
| 2001/0047878 A1 | 12/2001 | Bock et al. | 174/110 R |

* cited by examiner

METHOD OF MAKING A DYNAMOELECTRIC MACHINE CONDUCTOR BAR AND METHOD OF MAKING A CONDUCTOR BAR DYNAMOELECTRIC MACHINE, THE BAR AND THE MACHINE

This is a division of application Ser. No. 10/059,179 filed Jan. 31, 2002.

BACKGROUND OF THE INVENTION

The invention relates to a high voltage electrical winding conductor bar for use in a dynamoelectric machine. In particular, it relates to stator bars used in generators where the bars comprise strands of conductors bundled together, insulated from each other by strand insulation and additionally surrounded by groundwall insulation.

The thickness of stator bar groundwall insulation is a limiting factor in an electrical generator stator bar design and in machine output. If the thickness of the groundwall insulation can be reduced, more space would be available for conductors in the same slot. As a result, the size of the conductors can be increased thereby increasing conductor volume and current capacity for the same size bar. Alternately, the bar size could be decreased with no loss in conductor volume, resulting in reduced machine size with associated weight and material cost savings.

Presently, high voltage stator bars are constructed by bundling a number of conductors of copper or aluminum strands that are insulated from each other by strand insulation. The strands of insulation are commonly arranged to form two tiers that can be separated by a strand separator. Alternatively, the stator bar can be constructed with four-tier and six-tier strands. The strands can be arranged in a spiraling manner, also known as Robeling. Top and bottom edge uneven surfaces are created where spiraling conductor strands cross over from one tier to a next tier along the slot length. The conductor bar ends can be leveled or evened by molding a transposition filler to the ends during pressing of the conductor package.

A groundwall insulation can be provided by multiple wrappings of a mica paper tape surrounding the tier strands, strand insulation and transposition filler. The amount of insulation is dependent on the capability of the insulation to survive corner electrical stress concentration. Sharp corners concentrate electrical stress while conductor corner increased radius reduces stress. The general rectangular geometry of a stator bar results in high corner electrical stress.

It is desirable to reduce corner electrical stress. A reduction in electrical stress can result in a reduction in the amount of groundwall insulation, which can allow for additional space for conductors. Or a reduction in corner stress can increase a voltage rating of a dynamoelectric machine by providing generator stator bars that can operate at higher nominal voltage stress. Typically, corner stress is reduced by machining or shaving of strand corners. However, machining decreases strand copper content. Reduction in copper content reduces conductivity. Hence, the strands are machined or shaved only at or near their corners. Typically the copper cross-section in each strand spiraling is reduced up to 0.080 inch, usually 0.060 to 0.080 inch along the bar and typically only at one corner of each strand. Reduction greater than 0.080 inch can result in hot spots or leaks in hollow liquid cooling stator bars.

Hence, there is a need to effectively reduce voltage stress concentration by increasing radius at conductor bar surface corners without significantly decreasing strand copper or aluminum content.

SUMMARY OF THE INVENTION

The invention provides a method for making a dynamoelectric machine conductor bar suitable for use in a dynamoelectric machine. The bar has reduced corner stress that is achieved, surprisingly without decreasing strand copper or aluminum content. The method comprises providing a plurality of bundled together spiraling strand conductors having surrounding insulation to define a substantially rectangular shape with the strand conductors and strand insulation defining a conductor bar end portion having an electrically non-insulated gap between the strand insulation adjacent the conductor bar end portion; and applying a filler material to fill the gap to electrically shield the conductor bar end portion and to define a greater than 0.080 inch continuous outer radius surface end portion.

In another embodiment, the invention is a method for making a dynamoelectric machine having a stator with a high voltage winding comprising a plurality of conductor bars extending along slots in the winding, comprising: providing a plurality of bundled together spiraling strand conductors having surrounding insulation to define a substantially rectangular shape, with the strand conductors and strand insulation defining a conductor bar end portion having an electrically non-insulated gap between the strand insulation adjacent the bar end portion; and applying a filler material to fill the gap to electrically shield the conductor bar end portion and to define a greater than 0.080 inch continuous outer radius surface end portion.

The invention also relates to a high voltage electrical winding conductor bar suitable for use in a dynamoelectric machine. The dynamoelectric machine conductor bar comprises a plurality of bundled together spiraling strand conductors having surrounding insulation to define a substantially rectangular shape with the strand conductors and strand insulation defining an opposing conductor bar end portion; an electrically non-insulated gap between the strand insulation adjacent the conductors at the bar end portion; and an applied filler material filling the gap to electrically shield the conductor bar end portion an applied filler material filling the gap to electrically shield the conductor bar end portion, wherein the filler material defines a greater than 0.080 to about 1.5 inch continuous outer radius surface end portion.

In another embodiment, the invention is dynamoelectric machine having a stator with a high voltage winding comprising a plurality of conductor bars extending along slots in the winding, the conductor bars comprising: a plurality of bundled together spiraling strand conductors having surrounding insulation to define a substantially rectangular shape, with the strand conductors and strand insulation defining an opposing conductor bar end portion; an electrically non-insulated gap between the strand insulation adjacent the conductors at the bar end portion; and an applied filler material filling the gap to electrically shield the conductor bar end portion, wherein the filler material defines a greater than 0.080 to about 1.5 inch continuous outer radius surface end portion.

BRIEF DESCRIPTION OF THE DRAWINGS

The invention can be appreciated from the detailed description in connection with the accompanying drawings wherein.

DETAILED DESCRIPTION OF THE INVENTION

The conductor bar of the invention has a filler material that fills a gap that is defined between a substantially rectangular shaped bundle of strand conductors and surrounding insulation. Without the filler material, the abrupt corner angles of the relatively square corners of the rectangular stator cause stress concentrations on applied ground insulation. The filler material modifies the strand conductor outer radius surface to reduce this stress. The filler material can be applied to both top and bottom bar ends. Using filler material eliminates bar corner shaving and hence avoids reducing the bar copper or aluminum content.

Modifying the bar with filler material provides an increased conductor package surface corner radius, which reduces bar corner electrical stress. The invention can be used in combination with internal grading to further reduce bar corner electrical stress. A reduction in corner stress means that less ground insulation material is required to insulate the strand conductors. Less insulation improves heat transfer across the thinner groundwall insulation to the machine core. Also, reduction in ground insulation material means that additional space is available for copper conductors that can improve generator performance.

Figure 3:
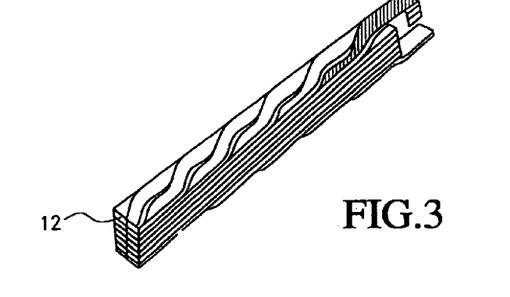
FIG. 3 is a view of a strand utilized in the conductor bar illustrating Roebeling or spiraling of the strands.

The filler material modified corner can provide a continuous outer surface corner radius. In an embodiment, the continuous radius is at least greater than 0.080 inches or in ranges of at least greater than 0.080 to 1.5 inches continuous outer radius surface, desirably 0.1 to 0.875 inches and preferably 0.125 to 0.75 inches continuous outer radius surface. The continuous surface corner radius is a surface of curvature transcribed by common radius line segments at the bar end portion as shown in FIG. 3.

Alternatively, the outer surface can be in an elliptical shape with a variable radius. The variable radius can fall in the range of 0.080 to 0.875 inches. In another alternative, the top edges of the filler material can be relatively flat with the corner radius of the filler material adjacent the conductor bar ends being greater than about 0.125 inches. The corner configurations of the invention impart improved reduced stress concentration to generally rectangular conductors.

In one embodiment, a fillet material is applied to the end portion to provide the enlarged outer radius surface. In this manner, the radius surface is enlarged without substantial loss of conductor cross-section material. Both top and bottom bar edges can be modified. Modifying the bar with a fillet material on top and bottom edges in combination with internal grading reduces electrical stress concentration on corner ground insulation. Hence, less insulation may be required and more space can be made available for copper conductors.

Internal grading can be provided to the filler material so that an equal potential voltage plane on the filler material larger radii outer surface results in the stress reducing benefits on the ground insulation. The internal grading can impart a resistivity in the range of 500 to 500,000 ohms per square, desirably 1,000 to 250,000 and preferably 2,000 to 100,000 ohms per square. For example, internal grading or low conductivity can be provided by the following:

Application of a low conductivity paint. Preferably, the low conductivity paint has a resistance in the range of 2,000 to 100,000 ohms per square in its cured state. The paint is applied into electrically conducting relation with the electrically non-insulated gap portions in the strand insulation. The paint can be applied on the top and bottom edges or across the conductor bar end portions of the bar.

Application of a low conductivity transposition filler. The low conductivity transposition filler can have a resistance in the range of 2,000 to 100,000 ohms per square in its cured state. It can be applied to conductor bar end portions during molding.

Wrapping of a low conductivity tape. The tape can have a resistance in the range of 2,000 to 100,000 ohms per square in its cured or dry state. The tape can be applied around the bar before the groundwall insulation is applied.

Alternately conductive filler strips. The strips can have a resistance in the range of 2,000 to 100,000 ohms per square. The strips can be molded or glued onto conductor package ends. Conductive fiberglass filler strips with correct resistively can be used.

The filler material can comprise a non-conductive thermoset material such as a putty made from an epoxy or polyester resin containing mica powder, mica paper, silica or other fillers. The filler material can also comprise a conductive non-metallic material such as a thermoset epoxy or polyester resin containing conductive carbon or graphite fillers. The filler material can be made of conducting or non-conducting laminated material, such as woven fiberglass treated with an epoxy or polyester resin.

The filler material can be molded onto the bar when the conductor package is pressed and cured during forming. Alternatively, a regular rectangular bar can first be pressed to shape and the filler material applied to the top and bottom bar corners. It is also possible to use a Roebel transposition filler such as a catalyzed epoxy resin filler on the bars together with a fillet strip, applied prior or subsequent to pressing. A thick layer of transposition filler can be molded onto the bar so that molded transposition filler extends above the uppermost strand and below the bottom-most strand. After molding, the corners can be machined to a desired radius. Also, mold tooling can be used to form the corner radius during a pressing operation.

These and other features will become apparent from the drawings and following detailed discussion, which by way of example without limitation describe preferred embodiments of the invention. In the drawings, corresponding reference characters indicate corresponding parts throughout the several figures.

Figure 1:
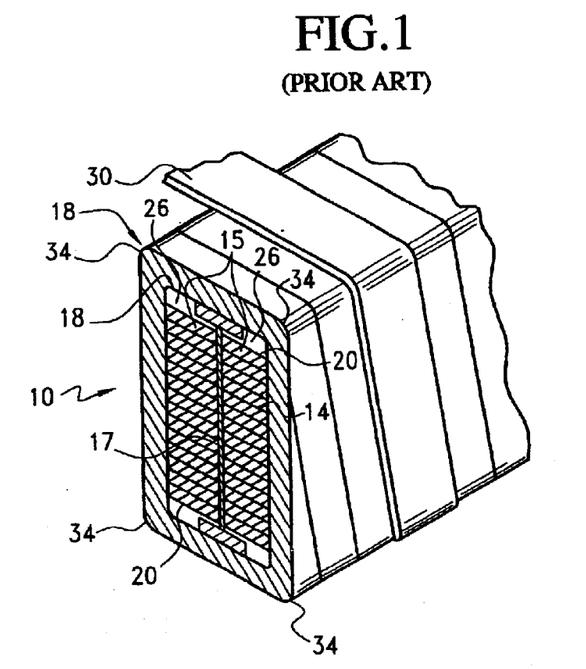
FIG. 1 is a cut away view of a prior art conductor bar for use in a high voltage winding of a generator.
Figure 2:
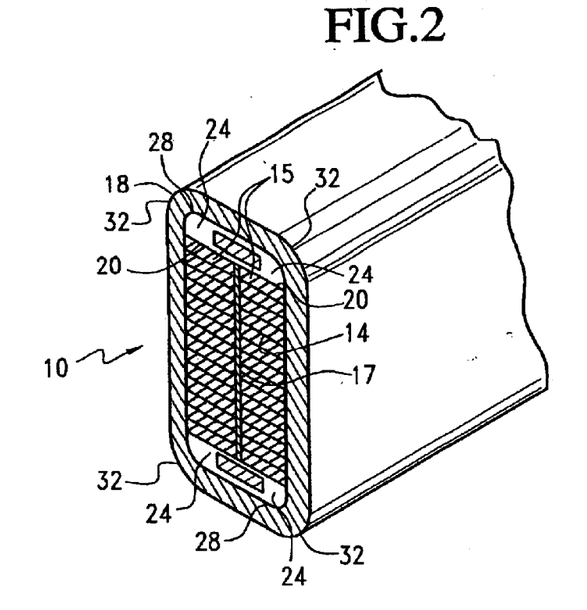
FIG. 2 is a cut away view of a conductor bar according to the invention for use in a high voltage winding of a generator.
Figure 4:
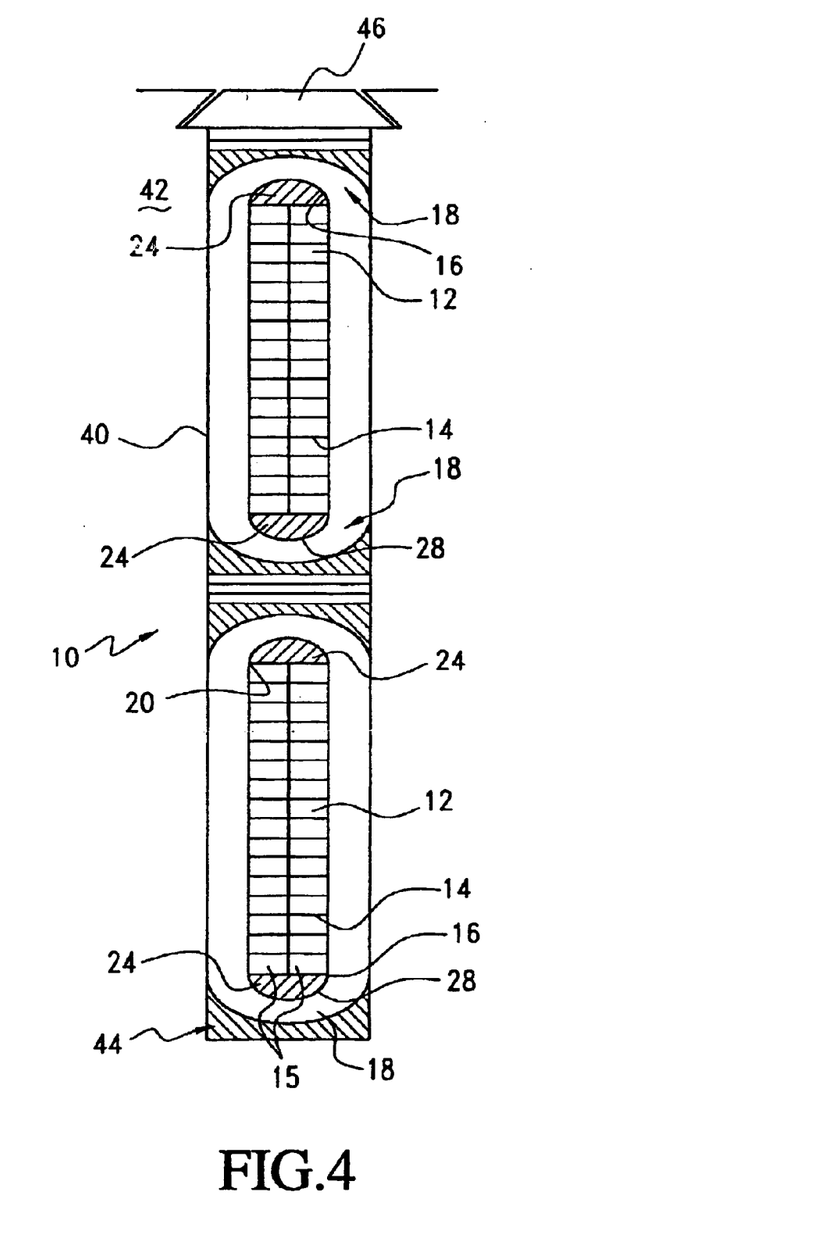
FIG. 4 is an end view showing the placement of the conductor bars as winding in slots in the generator.

FIG. 1 shows a prior art electrical conductor bar 10. In FIGS. 2 and 4, electrical conductor bar 10 is insulated according to the present invention. In FIGS. 1 to 3, the conductor bar 10 has a plurality of bundled together spiraling strand conductors 12. The strand conductors are also known as turns or turn conductors. The strand conductors 12 are spiraled in a manner referred to as Roebeling, shown more specifically in FIG. 3. The bars shown in FIGS. 1 to 3 are one-turn bars made up of a number of individual strands. The strands are individually insulated from one another by strand insulation 14 and are Roebeled to reduce electrical losses within the bar. Typically, the strand conductors comprise either an aluminum or copper material and portions of the strand insulation 14 are removed at 16 adjacent conductor bottom and top bar end portions.

Strand conductors 12 and strand insulation 14 define opposing bottom and top conductor bar end portions 18. As shown in FIG. 1, the corner radius at the end portions 18 defines a generally rectangular shaped structure. This corner radius is typically in the order of 0.031 inches and is less than 0.080 inches. The strand conductors 12 are arranged in two side-by-side columns or tiers 15. While FIGS. 1 to 3 show two tiers 15, the strands can be arranged in any number of tiers such as for example four-tiers or six-tiers. Between each tier 15 is a separator insulation 17.

FIGS. 2 and 4 show a conductor bar 10 with applied filler material 24. The material has been applied across the conductor bar end portions 18. The filler material 24 fills void area 26 that is defined by the spiraling of the strand conductors 12. The filler material 24 can be conducting and can function as internal grading. On the other hand, the filler material 24 can be non-conducting in which case, internal grading can be applied. In the non-conducting case, the filler material can have an electrically conductive paint applied to outer surface 28. In FIGS. 2 and 4, outer surface 28 has a surface corner radius greater than 0.08 inches. At least the outer surface 28 of the filler material 24 is in electrical conducting relation with the electrically non-insulated gap portions 16 to electrically shield the conductor bars 10 at the conductor bar end portions 18.

A groundwall insulation layer 30 in the form of a mica based tape surrounds the plurality of strand conductors 12 and the filler material 24 (in the cases of FIGS. 2 and 4). The groundwall insulation layer 30 follows the shape or radius of the conductor bar end portions 18. As a result, the groundwall insulation has rounded corners 32 in FIG. 2 and FIG. 4 and substantially square corners 34 in FIG. 1.

Further in FIG. 4, two conductor bars 10 are located within slots 40 of the core 42 of a winding of a generator. The slots are filled with non-conducting fillers 44 extruded in a half bow-tie shape. A wedge 46 assists to maintain the conductor bars 10 within the slots 40 of the core 42 of the high voltage winding.

Figure 5:
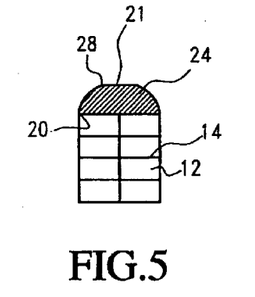
FIG. 5 illustrates the increased radius of the conductor bar prior to the application of the groundwall insulation.

In FIG. 5, the filler material 24 is formed onto the conductor bar end portions without the removal of any copper from the strand conductors 12. The corners 20 of the filler are in the range of 0.125 to 0.275 inches and have a flat portion 21 between corners 20.

Figure 6:
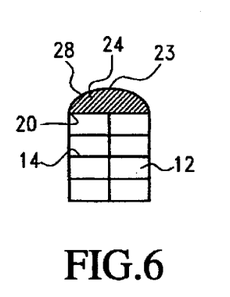
FIG. 6 illustrates the increased radius as a variable radius of the conductor bar prior to the application of the groundwall insulation.

In FIG. 6, the filler material 24 is formed onto the conductor bar end portions without the removal of any copper from the strand conductor 12. The corners 20 of the filler material are in the range of greater than or equal to 0.275 inches and the portion 23 of the filler between the corners has a variable radius.

Figure 7:
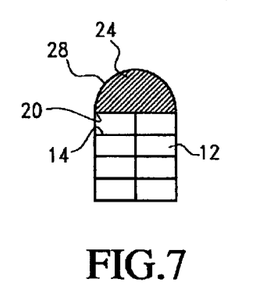
FIG. 7 illustrates the increased radius as a full round radius of the conductor bar prior to the application of the groundwall insulation.

In FIG. 7, the filler material 24 is formed onto the conductor bar end portions to form rounded edges without requiring removal of any copper. In this instance, the corners 20 and middle portion 25 are of the same radius, which is about 0.875 inches.

Figure 8:
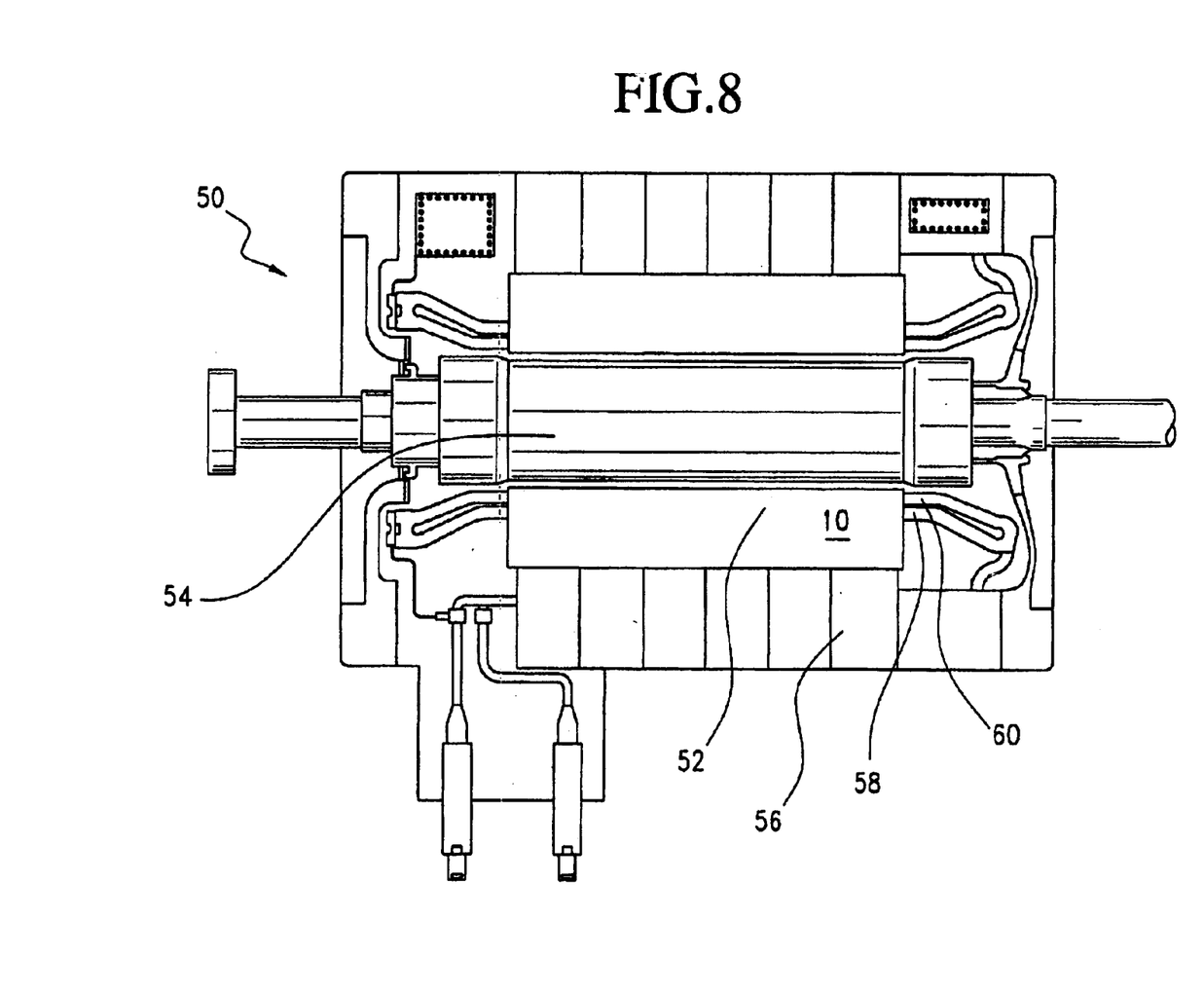
FIG. 8 is a cut away side schematic view of an dynamoelectric machine showing the location of a conductor bar.

FIG. 8 shows a dynamoelectric machine 50 showing the location of rotor 54 and conductor bar 10 including conductor core 52. The machine 50 includes generator frame 56 and top stator bar 58 and bottom stator bar 60.

The following EXAMPLES are illustrative and should not be construed as a limitation on the scope of the claims unless a limitation is specifically recited.

Voltage breakdown strength of an insulated stator bar is a measure of insulation quality and long term stability of the insulation when stressed at lower operating voltages. In the EXAMPLES, insulated stator bars were tested for breakdown strength immersed in oil to prevent flashover during testing. The test was started at 30,000 volts, 60 Hertz and held 60 seconds at that voltage. The voltage was then increased to 35,000 volts and held for 60 seconds. The voltage was raised in increments of 5,000 volts per 60-second steps until breakdown occurred. Breakdown voltage is equal to (highest voltage)−5000+[(5000 volts)×(seconds at the highest voltage/60 seconds)]. Breakdown strength in units of VPM (volts per mil) is the breakdown voltage/smallest average insulation thickness on the side of a bar in mils.

EXAMPLE 1

Stator bars having 0.060- to 0.080-inch corner radii were insulated with a mica tape containing mica paper and glass fabric backer. The resin binder for the tape was based on U.S. Pat. No. 5,618,891. Internal grading was applied using a glass fabric tape. The breakdown strength of these bars was 874±44 VPM.

EXAMPLE 2

A 0.090-inch thick glass-epoxy strip was bonded to the top and bottom edges of a bare bar having the same dimensions as those used in EXAMPLE 1. The corners were then machined to 0.15-inch radii. The bar was internally graded with the same glass tape and taped with the same mica tape used in EXAMPLE 1. The same number of mica tape layers was used. The voltage breakdown strength of this bar was 1,017 VPM.

EXAMPLE 3

A 0.060-inch thick glass-epoxy strip was bonded to the top and bottom edges of a bare bar having the same dimensions as those used in EXAMPLE 1. The bar corners were then machined to 0.15-inch radii. The bar was internally graded with the same tape used and taped with the same mica tape used in EXAMPLE 1. The same number of mica tape layers was used. The voltage breakdown strength of this bar was 1,024 VPM.

EXAMPLE 4

Long term voltage endurance tests were conducted. The baseline groundwall insulation system described in EXAMPLE 1 using stator bars having corner radii of 0.060 to 0.080-inch was tested at different voltage stress levels in order to determine endurance life as a function of voltage stress. Based on a statistical distribution of times-to-failure for this baseline group, a mathematical expression was developed to establish a baseline performance value.

EXAMPLE 5

The performance of individual stator bars were subsequently tested under identical conditions but with corner radii greater than 0.080-inch. For convenience, voltage endurance performance of individual experimental bars is expressed in per unit of the median life expectancy for the baseline insulation having corner radii from 0.060 to 0.080 inch.

A bar identical to those in EXAMPLE 4 was modified by bonding a 0.060-inch thick epoxy-woven glass laminate to its top and bottom edges. The laminate was bonded with a solvent-less epoxy adhesive. After the epoxy adhesive cured, the corners of the bar were machined to 0.15-inch radii. The bar was insulated with the same mica tape used in the EXAMPLE 4 bars. The insulated bar was tested for voltage endurance at 40 kV. The bar did not fail even after exceeding the median life of the bars of EXAMPLE 4 by a factor of 1.62.

EXAMPLE 6.

Another bar was made that had the same bare bar modifications as the bar in EXAMPLE 5. The bar was insulated with the same mica tape used in EXAMPLE 4. The bar was tested for voltage endurance at 40 kV. This bar did not fail even after exceeding the median life of the bars of EXAMPLE 4 by a factor of 1.40.

The results for the EXAMPLES 5 and 6 bars were 62% and 40% respectively better than the baseline results of EXAMPLE 4.

The voltage breakdown strength and voltage endurance tests of EXAMPLES 2, 3, 5 and 6 for increased radii bars show the superior performance and improved resistance to voltage stress concentration of the generator stator bars of the invention.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A dynamoelectric machine conductor bar, comprising:
   a plurality of bundled together spiraling strand conductors having surrounding insulation to define a substantially rectangular shape, with the strand conductors and strand insulation defining an opposing conductor bar end portion;
   an electrically non-insulated gap between the strand insulation adjacent the conductors at the bar end portion; and
   an applied filler material filling the gap to electrically shield the conductor bar end portion, wherein the filler material defines a greater than 0.080 to about 1.5 inch continuous outer radius surface end portion, and wherein the filler material comprises an electrically non-conducting fillet and an outer surface of the fillet comprises a low conductivity paint having a conductivity in the range of 2,000 to 100,000 ohms per square in its cured state.

2. The dynamoelectric machine conductor bar of claim 1, wherein the filler material defines a 0.10 to 0.8 75 inch continuous outer radius surface end portion.

3. The dynamoelectric machine conductor bar of claim 1, wherein the filler material defines a 0.125 to 0.75 inch continuous outer radius surface end portion.

4. The dynamoelectric machine conductor bar of claim 1, further comprising a groundwall insulation layer surrounding the plurality of strand conductors and the filler material.

5. The conductor bar of claim 1, wherein the filler material defines a variable outer radius surface.

6. The conductor bar of claim 1, wherein the filler material is a glass-epoxy strip.

7. The conductor bar of claim 1, wherein the filler material is a fillet that is applied to the conductor bar during a molding step.

8. The conductor bar of claim 1, wherein the filler material is an electrically non-conducting fillet.

9. A dynamoelectric machine having a stator with a high voltage winding comprising a plurality of conductor bars extending along slots in the winding, the conductor bars comprising:
   a plurality of bundled together spiraling strand conductors having surrounding insulation to define a substantially rectangular shape, with the strand conductors and strand insulation defining an opposing conductor bar end portion;
   an electrically non-insulated gap between the strand insulation adjacent the conductors at the bar end portion; and
   an applied filler material filling the gap to electrically shield the conductor bar end portion, wherein the filler material defines a greater than 0.080 to about 1.5 inch continuous outer radius surface end portion, wherein the filler material comprises an electrically non-conducting fillet and an outer surface of the fillet comprises a low conductivity paint having a conductivity in the range of 2,000 to 100,000 ohms per square in its cured state.

10. The dynamoelectric machine of claim 9, wherein the filler material defines a greater than 0.080 to about 1.5 inch continuous outer radius surface end portion.

11. The dynamoelectric machine of claim 9, wherein the filler material defines a 0.10 to 0.875 inch continuous outer radius surface end portion.

12. The dynamoelectric machine of claim 9, wherein the filler material defines a 0.125 to 0.75 inch continuous outer radius surface end portion.

13. The dynamoelectric machine of claim 9, further comprising a groundwall insulation layer surrounding the plurality of strand conductors and the filler material.

14. The dynamoelectric machine of claim 9, wherein the filler material defines a variable outer radius surface.

15. The dynamoelectric machine of claim 9, wherein the filler material is a glass-epoxy strip.

16. The dynamoelectric machine of claim 9, wherein the filler material is a fillet that is applied to the conductor bar during a molding step.

17. The dynamoelectric machine of claim 9, wherein the filler material is an electrically non-conducting fillet.

18. A method for making a dynamoelectric machine conductor bar, compromising:
   providing a plurality of bundled together spiraling strand conductors having surrounding insulation to define a substantially rectangular shape, with the strand conductors and strand insulation defining an opposing conductor bar end portion having an electrically non-insulated gap between the strand insulation adjacent the bar end portion; and
   applying a fillet as a filler material to fill the gap to electrically shield the conductor bar end portion and to define a greater than 0.080 inch continuous outer radius surface end portion, wherein the fillet comprises am electrically non-conducting material with an outer surface that comprises a low conductivity paint having a conductivity in the range of 2,000 to 100,000 ohms per square in its cured state.

19. The method of claim 18, further comprising surrounding the plurality of strand conductors and the filler material with a groundwall insulation layer.

20. The method of claim 18, comprising applying the filler material to define an outer surface having a variable radius.

21. The method of claim 18, comprising applying the filler material to define on outer surface corner radius adjacent the corners of the conductor end portions in the range of 0.275 to 0.875 inches.

22. The method of claim 18, comprising applying the filler material to the conductor bar during a step of molding of the bar.

23. The method of claim 18, comprising applying the filler material and shaving to define a greater than 0.080 to 1.5 outer radius surface.

24. The method of claim 18, comprising applying the filler material to define a greater than 0.080 to 1.5 outer radius surface without shaving.

25. A method for making a dynamoelectric machine having a stator with a high voltage winding comprising a plurality of conductor bars extending along slots in the winding, comprising:

providing a plurality of bundled together spiraling strand conductors having surrounding insulation to define a substantially rectangular shape, with the strand conductors and strand insulation defining an opposing conductor bar end portion having an electrically non-insulated gap between the strand insulation adjacent the bar end portion; and applying a filler material to the conductor bar during a step of molding the bar to fill the gap to electrically shield the conductor bar end portion and to define a greater than 0.080 inch continuous outer radius surface end portion.

26. The method of claim 25, further comprising surrounding the plurality of strand conductors and the filler material with a groundwall insulation layer.

27. The method of clam 25, comprising applying the filler material to define an outer surface having a variable radius.

28. The method of claim 25, comprising applying the filler material to define an outer surface radius adjacent the corners of the conductor end portions in the range of 0.275 to 0.875 inches.

29. The method of claim 25, comprising applying the filler material and shaving to define a greater than 0.080 to 1.5 outer radius surface.

30. The method of claim 25, comprising applying the filler material to define a greater than 0.080 to 1.5 outer radius surface without shaving.

* * * * *